M. L. GODEFROY.
EXPOSURE METER.
APPLICATION FILED AUG. 1, 1919.

1,346,088.

Patented July 6, 1920.

INVENTOR.
Marie Léon Godefroy
BY
ATTORNEY.

UNITED STATES PATENT OFFICE.

MARIE LÉON GODEFROY, OF PARIS, FRANCE.

EXPOSURE-METER.

1,346,088. Specification of Letters Patent. Patented July 6, 1920.

Application filed August 1, 1919. Serial No. 314,789.

*To all whom it may concern:*

Be it known that I, MARIE LÉON GODEFROY, a citizen of the French Republic, residing in Paris, France, have invented certain new and useful Improvements in Exposure-Meters, of which the following is a specification.

This invention relates to an exposure meter for use in photography, which is based on the position of invisibility of a slot arranged between the eye of an observer and a translucent screen divided into a certain number of equal sectors, the opacity of which increases in a uniform manner.

This screen can be rotated, while a disk provided with a viewing slot remains stationary, or conversely.

The moment when a single slot becomes invisible being fairly difficult to determine with precision, two adjoining slots are provided, one of which can be seen to disappear while the other one still remains faintly visible.

The instrument can be arranged as a telescope, owing to which it is possible to look directly at the object to be photographed, and to measure, not merely general luminosity, but the intensity of the light emitted by the said object.

In order to render the observations more reliable, the eye of the observer is completely protected from the outer light by a flexible and opaque fitting.

In order to make the following explanation as clear as possible, the accompanying drawing illustrates, by way of example, a construction of the exposure meter.

In the drawing:—

Figure 1:
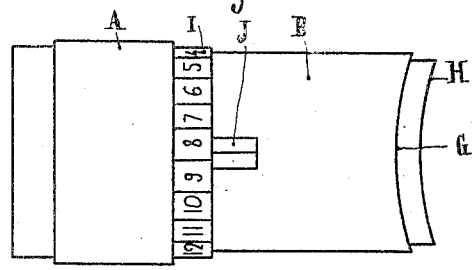
Figure 1 is an elevation of the complete instrument.
Figure 2:
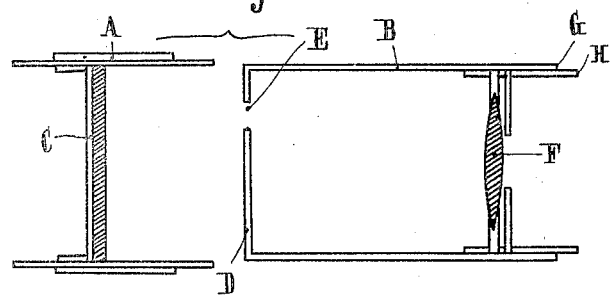
Fig. 2 is a longitudinal section in which the constituent parts are shown separated from each other.
Figure 3:
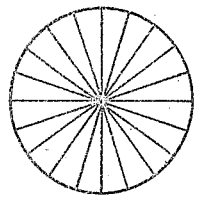
Fig. 3 shows a translucent screen divided, in the present example, into twenty equal sectors.
Figure 4:
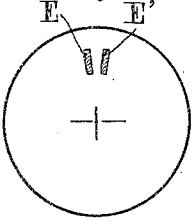
Fig. 4 shows a disk with viewing slots.
Figure 5:
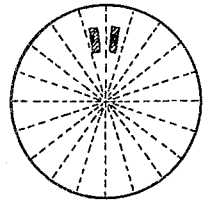
Fig. 5 shows the position of the two slots arranged behind the translucent screen, the sectors of the screen being indicated by dotted lines.

The instrument can be made of any suitable material, for instance of cardboard, brass, aluminium, ivorin, ebonite, etc., which of course will necessarily involve in each case some modifications in the process of manufacture.

The exposure meter chiefly comprises two tubes A, B which fit slidably into each other, so that when holding one of the tubes, the other can be turned about its axis.

A circular screen C divided into a series of sectors of increasing opacity, is placed within the end of the tube A which extends beyond the screen so as to shade the latter. The end of the tube B which passes into the tube A, is constituted by a disk D in which are provided two juxtaposed, radial slots E, $E^1$. At the other end of the said tube is mounted a short focus convex lens F through which the slots E, $E^1$ can be viewed and which reduces as far as possible the length of the instrument. The free end G of the same tube B is cut in the form of an eye-shade and is moreover provided with a flexible and opaque fitting or attachment H intended to form a light tight joint around the eye of the observer.

The edge I of the tube A is provided on its periphery with as many divisions as there are sectors on the screen. These divisions are numbered 1 to 20, so that in the case of the example illustrated, 1 corresponds to the greatest luminosity, and consequently to the shortest time of exposure.

On the tube B is arranged an index J, the position of which corresponds to the slot which has to remain faintly visible during the observation.

In order to use the exposure meter, the tube B is held in the right hand, and after having placed the instrument against the eye, the tube A is turned with the left hand until the two slots E, $E^1$ are clearly visible. The same tube is then turned in the desired direction in order to obtain the extinction of one of the slots (that on the right in the present case), while the other one remains faintly visible. The division which is in front of the index, is then noted, and by means of a table or of a curve constructed experimentally, the desired time of exposure is obtained directly.

In the event of the object to be photographed emitting rays of small actinic value, such as red, orange and yellow rays, it is advisable to render the indications of the exposure meter more precise, as in this case the luminous impression on the eye of the observer is no longer in perfect harmony with the photographic value of the light emitted by the object. In order to arrive at this result, it is sufficient to intercept and to absorb a more or less considerable part of the red, orange and yellow rays, which is easily done by fitting the instrument with a transparent or translucent screen of a suitable color, for instance of blue color, the shade and the intensity of which must be regulated so as to obtain the result desired. The position of the color screen in the interior of the instrument is of no importance, provided that it is arranged between the object to be photographed and the eye of the observer, and provided of course that it does not interfere with the distinctness of the view of the two slots.

What I claim as my invention and desire to secure by Letters Patent is:—

1. A photometer, comprising front and rear parts, one of which is rotatable while the other is held stationary; a translucent screen carried by the front part and divided into a large number of equal sectors of regularly-increasing opacity and of small angularity; and a disk carried by the rear part and provided with a pair of juxtaposed radial slots which are caused to travel across the successive sectors during the movement of the rotatable part until a point is reached in the course of such rotation when one of the slots disappears from vision while the other slot still remains faintly visible.

2. In a photometer, the combination of a pair of telescoping tubes, one of which is rotatable with relation to the other; a translucent screen carried by the front tube and divided into a large number of equal sectors of regularly-increasing opacity and of small angularity; a disk fitted in the rear tube and provided with a pair of juxtaposed radial slots which are caused to travel across the successive sectors during the movement of the rotatable tube until a point is reached in the course of such rotation when one of the slots disappears from vision while the other slot still remains faintly visible; a scale on the inner end of one tube graduated to correspond to the sectors of the screen; and a member on the other tube for coöperation with said scale during the movement of the rotatable tube to indicate the particular graduation corresponding to the said disappearing point.

3. In a photometer, the combination of a translucent screen divided into a large number of sectors of regularly-increasing opacity and small angularity; a disk located between the screen and the eye of the observer and provided with a pair of juxtaposed, radial slots; said screen and disk constructing companion parts, one of which is adapted to be rotated relatively to the other to cause said slots to travel across the successive sectors until a point is reached in the course of such rotation when one of the slots vanishes while the other slot still remains faintly visible; and a flexible eye-shade adapted to completely encircle the eye of the observer so as to cut off all external light therefrom.

In testimony whereof I have signed this specification in the presence of two subscribing witnesses.

MARIE LÉON GODEFROY.

Witnesses:
 EICORA,
 CHAS. P. PRESSLY.